United States Patent
Rott et al.

(10) Patent No.: US 10,618,621 B1
(45) Date of Patent: Apr. 14, 2020

(54) MARINE PROPULSION SYSTEMS AND METHODS

(71) Applicant: GoodLife Mobility, Redwood City, CA (US)

(72) Inventors: Dainuri Rott, Redwood City, CA (US); Jeffrey Janes, Pleasanton, CA (US); Leonard Hill, Benton, AR (US)

(73) Assignee: GoodLife Mobility, Redwood City, CA (US)

( * ) Notice: Subject to any disclaimer, the term of this patent is extended or adjusted under 35 U.S.C. 154(b) by 151 days.

(21) Appl. No.: 15/667,564

(22) Filed: Aug. 2, 2017

Related U.S. Application Data (60) Provisional application No. 62/370,073, filed on Aug. 2, 2016.

(51) Int. Cl.
| | |
|---|---|
| *B63H 21/21* | (2006.01) |
| *B63H 25/02* | (2006.01) |
| *G05D 1/02* | (2020.01) |
| *G05G 9/047* | (2006.01) |
| *H04L 29/08* | (2006.01) |
| *G06Q 10/10* | (2012.01) |

(52) U.S. Cl.
CPC .......... *B63H 21/213* (2013.01); *B63H 25/02* (2013.01); *G05D 1/0206* (2013.01); *G05G 9/047* (2013.01); *H04L 67/12* (2013.01); *B63H 2025/026* (2013.01); *G06Q 10/10* (2013.01)

(58) Field of Classification Search
CPC .................................................. B63H 25/413
See application file for complete search history.

(56) References Cited

U.S. PATENT DOCUMENTS

| | | | |
|---|---|---|---|
| 5,582,125 A * | 12/1996 | Matsumoto | ........... B63B 35/731 114/55.5 |
| 6,132,267 A | 10/2000 | Campbell | |
| 6,273,771 B1 | 8/2001 | Buckley et al. | |
| 6,299,493 B1 | 10/2001 | Griffith, Sr. et al. | |
| 8,626,366 B2 | 1/2014 | Noffsinger et al. | |
| 8,925,414 B1 * | 1/2015 | Park | ....................... B63H 21/21 137/636.1 |
| 10,082,788 B1 * | 9/2018 | Dengel | .................. B63H 25/02 |
| 2014/0277850 A1 | 9/2014 | Jobs et al. | |

* cited by examiner

*Primary Examiner* — Lail A Kleinman (57) ABSTRACT

Marine vessel propulsion systems and methods for controlling speed and direction of marine vessel propulsion systems. A processing device can receive, from a user device, a signal indicative of a desired direction and speed input to the user device; store the desired direction and speed signal in the memory; generate control signals indicative of a power input, wherein each of the control signals is associated with a particular motor of the marine vessel propulsion system; and transmit each of the control signals to a corresponding one of the motors to move the marine vessel in a desired direction and at a desired speed.

8 Claims, 12 Drawing Sheets

MARINE PROPULSION SYSTEMS AND METHODS

RELATED APPLICATIONS

This patent application claims the benefit under 35 U.S.C. § 119(e) of U.S. Provisional Application No. 62/370,073, filed Aug. 2, 2016, which is incorporated herein by reference.

FIELD

The disclosure relates generally to the field of marine propulsion systems and methods, and more specifically, to a marine jet propulsion system for a marine vessel.

BACKGROUND

Marine jet drive propulsion motors offer advantages over traditional outboard propulsion motors because they are safe for swimmers and passengers of the marine vessel as no sharp or rotating components are exposed to cause possible injury. Additionally, they function effectively in very shallow water and are resistant to damage from collision with hard bottom obstacles in the body of water being navigated.

Directional control of known marine vessel propulsion systems is typically implemented with a steering wheel whereas navigation is accomplished via an integrated on-board global positioning system ("GPS"). However, traditional outboard propulsion systems, particularly those with such steering wheels and navigation systems, may be impossible or extremely difficult for a person with severe lower extremity injury or amputated limbs, for example, paraplegics and amputees.

There is a need for safe and improved marine vessel jet drive propulsion systems capable of operation (or assisted operation) and control (or assisted control) by persons, for example, those with severe injuries or conditions.

DETAILED DESCRIPTION

Figure 1:
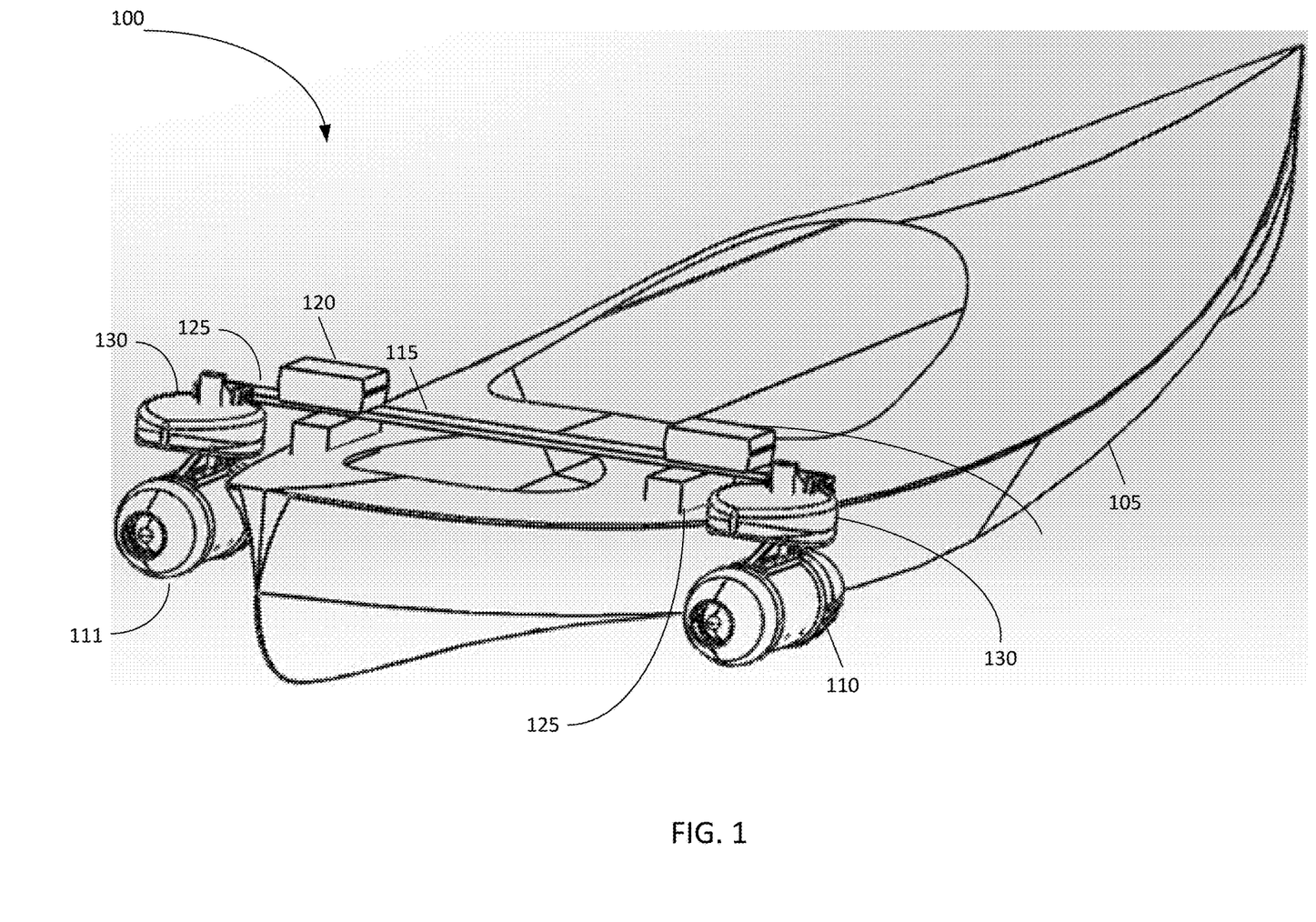
FIG. 1 shows a marine vessel propulsion system in accordance with various example aspects of the disclosure.

FIG. 1 shows a marine vessel propulsion system 100 according to various example aspects of the disclosure. As shown in FIG. 1, a marine vessel 105, for example, a boat, kayak, canoe, surfboard, stand up paddle board, etc., can be equipped with propulsion jet drives 110, 111. Each jet drive 110, 111 is attached to a crossbar 115 and vertically positioned such that the jet drive 110, 111 is submerged in water when the marine vessel 105 is in use. The jet drives 110, 111 can be attached via mounting rods (see FIG. 2) to opposite ends of a crossbar 115, for example, a wood board, a metal rod or beam, etc., in a spaced apart relationship. The crossbar 115 can be affixed to the marine vessel 105, for example, by brackets, bolts or other known affixing means 120 to mounting protrusions 125 of the marine vessel 105. The crossbar 115 can be adjustable in length in order to accommodate different widths of marine vessels 105. For example, the crossbar 115 can be equipped with a gliding mechanism such that the length can be expanded to fit the width of the marine vessel 105 and then attached thereto. In an alternative aspect, the crossbar 115 can have an accordion-type mechanism such that crossbar 115 can be lengthened or shortened to fit the width of a variety of marine vessels 105. According to certain example aspects, the system 100 can accommodate a variety of fixed length crossbars 115 (e.g., having standard sizes ranging from about 20 inches to about 60 inches in about 5 to about 10 inch increments) that are removable such that, depending upon the width of the marine vessel 105, the appropriate sized crossbar 115 is installed to ensure the jet drives 110, 111 clear the sides of the marine vessel 105.

It should be noted that the addition of the marine vessel propulsion system 100 to a marine vessel 105, for example a kayak or canoe, helps to stabilize the marine vessel 105 against tipping and overturning. In certain example aspects, the jet drives 110, 111 can each include a lily pad 130 flotation device as will be described further below, to help further stabilize the marine vessel 105 in the water and further reduce the possibility of tipping or overturning.

Figure 2:
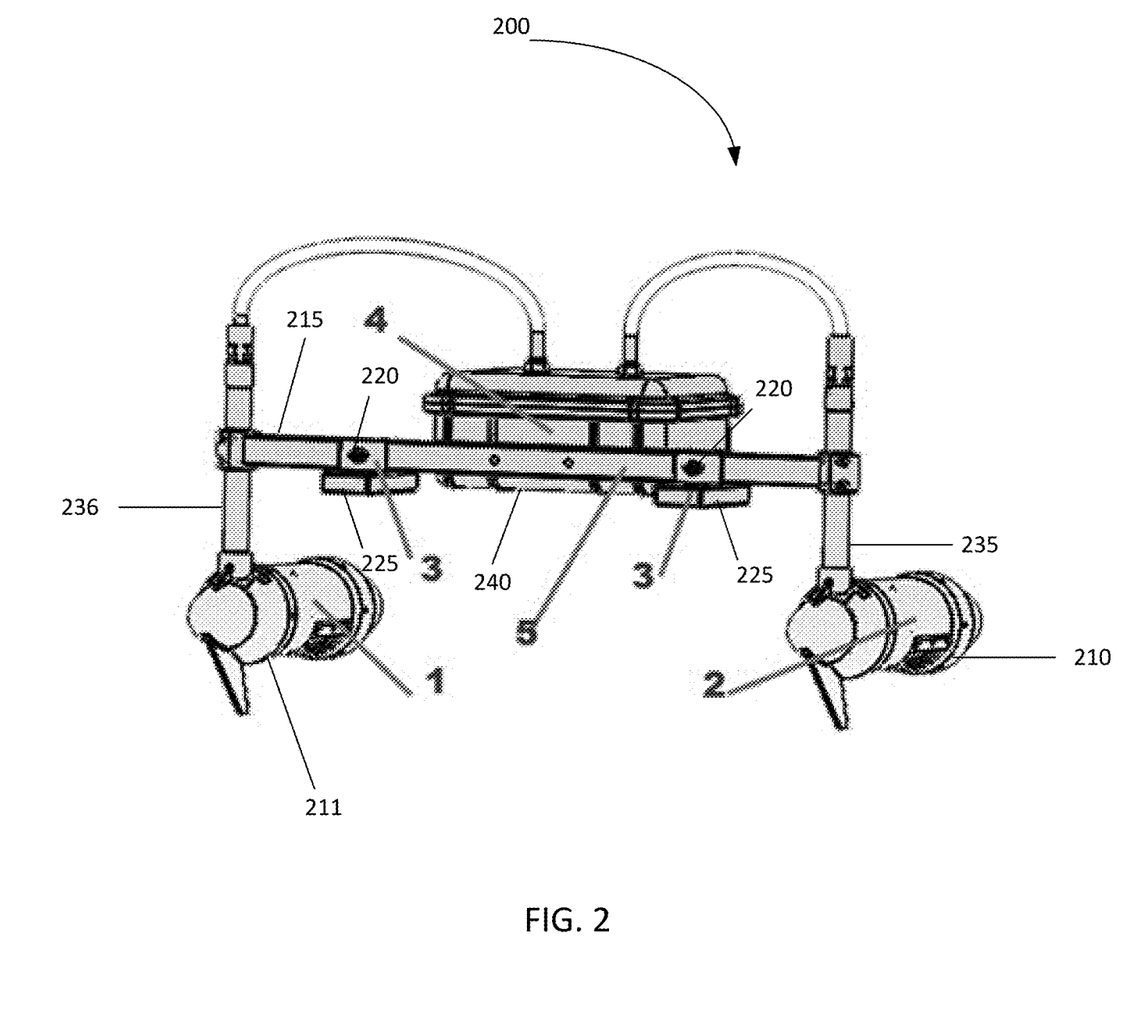
FIG. 2 shows example aspects of a marine vessel propulsion system.

FIG. 2 shows further example aspects of a marine vessel propulsion system according to the disclosure. As shown in FIG. 2, the marine vessel propulsion system 200 can further include a control unit 240 having a controller, for example, a programmable logic controller ("PLC") and a power source (not shown), for example, a battery, a solar cell, a fuel cell, an internal combustion engine, and combinations thereof, some of which may be rechargeable, etc., which is electrically attached, for example, via cables, electrical wires, etc., to each jet drive 210, 211. The control unit 240 supplies power via the power source to the jet drives 210, 211 to rotate the impellers (not shown). According to certain example aspects, the power source can supply about 200 watts (about 0.27 horsepower) to about 300 watts (about 0.40 horsepower) to each jet drive 210, 211. Depending on the size and type of the marine vessel, for example, a kayak or surfboard, the power source can be configured to supply about 800 to about 1,200 watts to each jet drive 210, 211 to achieve a speed of the marine vessel of about 20 miles per hour. Each jet drive 210, 211 is attached to a vertical mounting rod 235, 236 to which each end of the crossbar 215 is attached, for example, by bolts, welds, etc., in a perpendicular relationship. Each mounting rod 235, 236 can be adjusted up or down and secured in place, for example, by a clamp fitting as shown in FIG. 2. Each mounting rod 235, 236 can be constructed of a suitable material such as stainless steel, plastic and all suitable rigid materials known to those of ordinary skill in the art. According to certain example aspects, each mounting rod 235, 236 is hollow such that a suitable waterproof cable or wire is threaded therethrough connecting the power supply and control unit 240 to the jet drives 210, 211. The cable or wire can be about 6 gauge to about 16 gauge depending upon the desired current for each jet drive 210, 211. The fittings at the end of each mounting rod 235, 236 are also waterproof fittings as are well-known to those of ordinary skill in the art. As will be described in more detail below, a user device, such as a human machine interface ("HMI") (not shown), for example, a joystick, a two-position switch, a foot switch, a dial, etc., can be connected, for example, via hardwire, Bluetooth®, WiFi, MiWi, USB and the like to a control unit 240. A computing device (not shown) such as a cell phone can also be connected to the control unit 240 such that inputs from the computing device relating to speed or direction can be transmitted via software, for example an Android® or iOS application, to the control unit 240. According to various example aspects of the disclosure, the computing device can be used without a separate HMI, for example, software can be downloaded onto the computing device and a user can access the software to input a desired speed and direction for transmission to the control unit 240.

Figure 3:
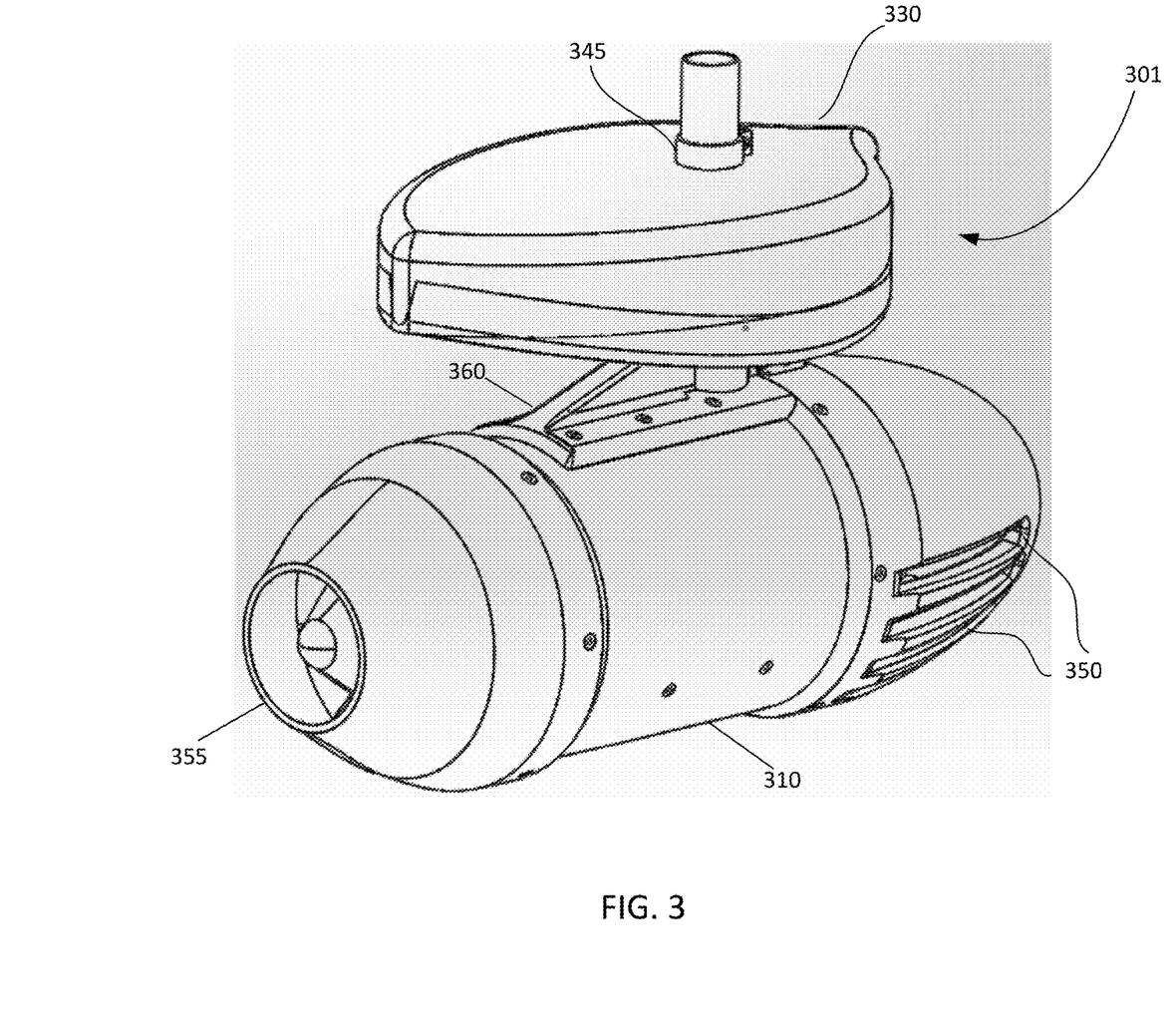
FIG. 3 shows example aspects of a propulsion jet drive with a lily pad component.

FIG. 3 shows various example aspects of a propulsion jet drive 310 and lily pad 330 unit 301 for use in a marine vessel propulsion system according to the disclosure. The lily pad 330 has a hole through which the mounting rod 335 can be inserted. The lily pad 330 can be secured in place with a fastener 345, for example, a clamp. As shown in FIG. 3, the mounting rod 335 can be attached to the jet drive 310 via a bracket 360. The lily pad 330 can be constructed of a foam material, for example, any closed cell foam or flexible material having a density of less than water. In certain example aspects, the lily pad 330 is a solid piece of closed cell foam, e.g., polyethylene, polystyrene, neoprene that can be molded and/or precut. The lily pad 330 can be molded or cut into a variety of shapes. For example, the lily pad 330 can be shaped as shown in FIGS. 1 and 3 taking into consideration the fluid mechanics of the lily pad 350 when floating in and/or moving through sea water (e.g., drag forces and buoyant forces based on Archimedes Principle). Such shape helps minimize drag when the marine vessel is in motion while still providing lateral stability to the marine vessel to minimize/prevent rocking or tipping. The mounting rod 335 and jet drive 310 components can be constructed of any suitable sea water resistant material, for example, stainless steel, polyvinyl chloride, other suitable plastics known to those of ordinary skill in the art, anodized aluminum, fiberglass, etc. During operation, liquid flows in through nozzles 350 located at a front end of the jet drive 301 and exits through the outlet 355 of the jet drive.

Figure 4:
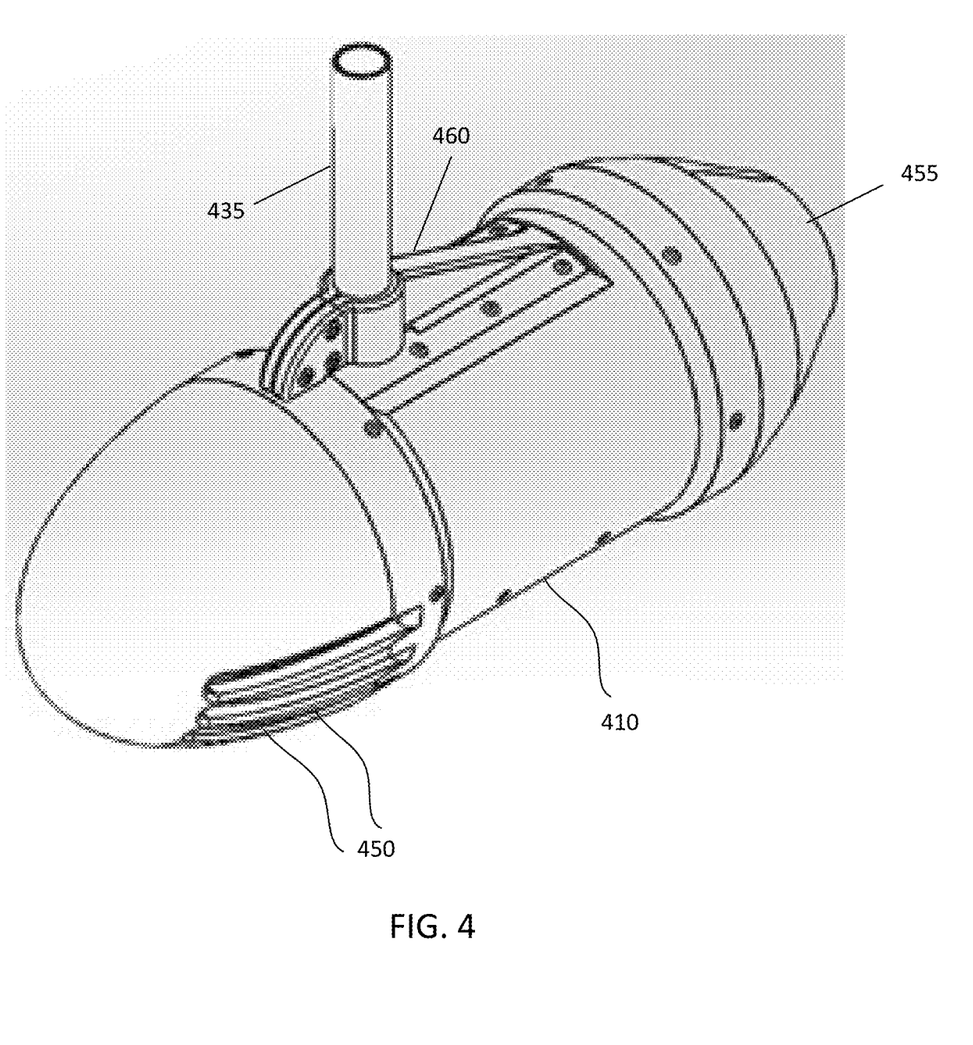
FIG. 4 shows example aspects of a propulsion jet drive without a lily pad component.

According to various example aspects of the disclosure as shown in FIG. 4, the jet drive 410 can be constructed without a lily pad. The remaining components and operational features can be the same as those shown and described with respect to FIG. 3. As more clearly shown in FIG. 4, the bracket 460 which attaches the mounting rod 435 to the jet drive 410 can form a clamp around an end of the mounting rod 435, the components being secured to each other via screws, bolts and clamp fittings, for example.

Figure 5:
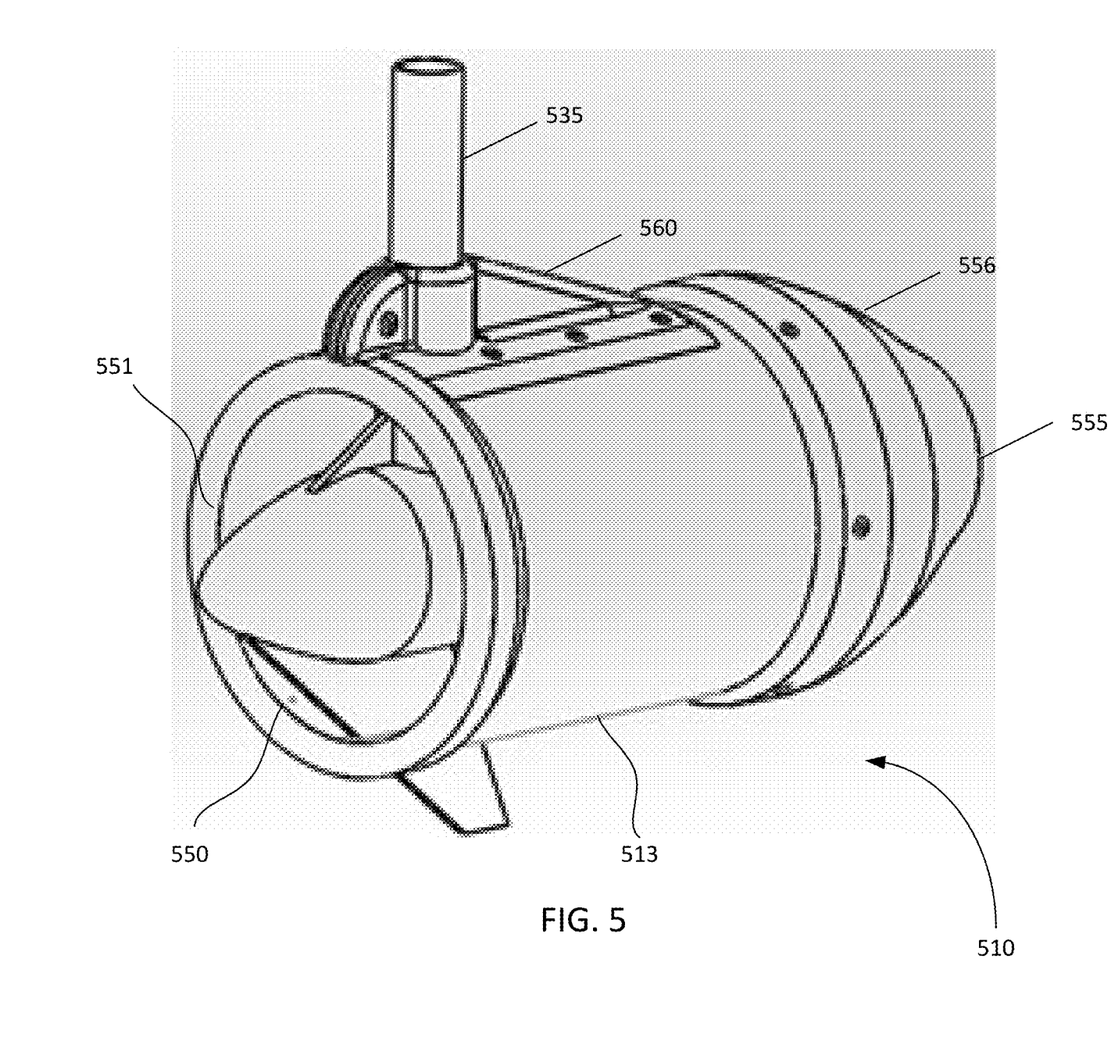
FIG. 5 shows example aspects of an alternative propulsion jet drive design.

FIG. 5 shows various example aspects of a jet drive 510 for use in a marine vessel propulsion system according to the disclosure. The jet drive 510 shown in FIG. 5 can be used for clear water applications where there is little or no fouling caused by algae, kelp, seaweed, driftwood or other types of debris that can be found in water. As shown in FIG. 5, the rear cover 556 of the jet drive can form an outlet 555. Additionally, the front end of the jet drive 510 does not have a cover with orifices as compared to the jet drives shown in FIGS. 3 and 4. Such cover is often not needed in clear water applications. Without the cover, the jet drive 510 shown in FIG. 5 can provide higher speeds of the marine vessel through the water because as the jet drive 510 propels through the water, the water gets "pushed into" the jet drive 510 and displaced more quickly as compared to the jet drives in FIGS. 3 and 4 which must "pull in" the water. It should be noted that the jet drives depicted in FIGS. 3 and 4, however, may be more appropriate for applications where the water contains debris and/or other types of fouling. According to various example aspects of the disclosure, the jet drives shown in FIGS. 3 to 5 can be modified to include or not include a front cover at the inlet 350, 450, 550 depending on the anticipated water application and/or desired speed. As shown in FIG. 5, instead of a front cover, a flange 551 surrounds the inlet 550. It should be noted that having the motor inside the body 513 of the jet drive 551 simplifies the design and requires fewer parts than other known drives. Also, the water, which comes into contact with the motor, helps to cool the motor.

Figure 6:
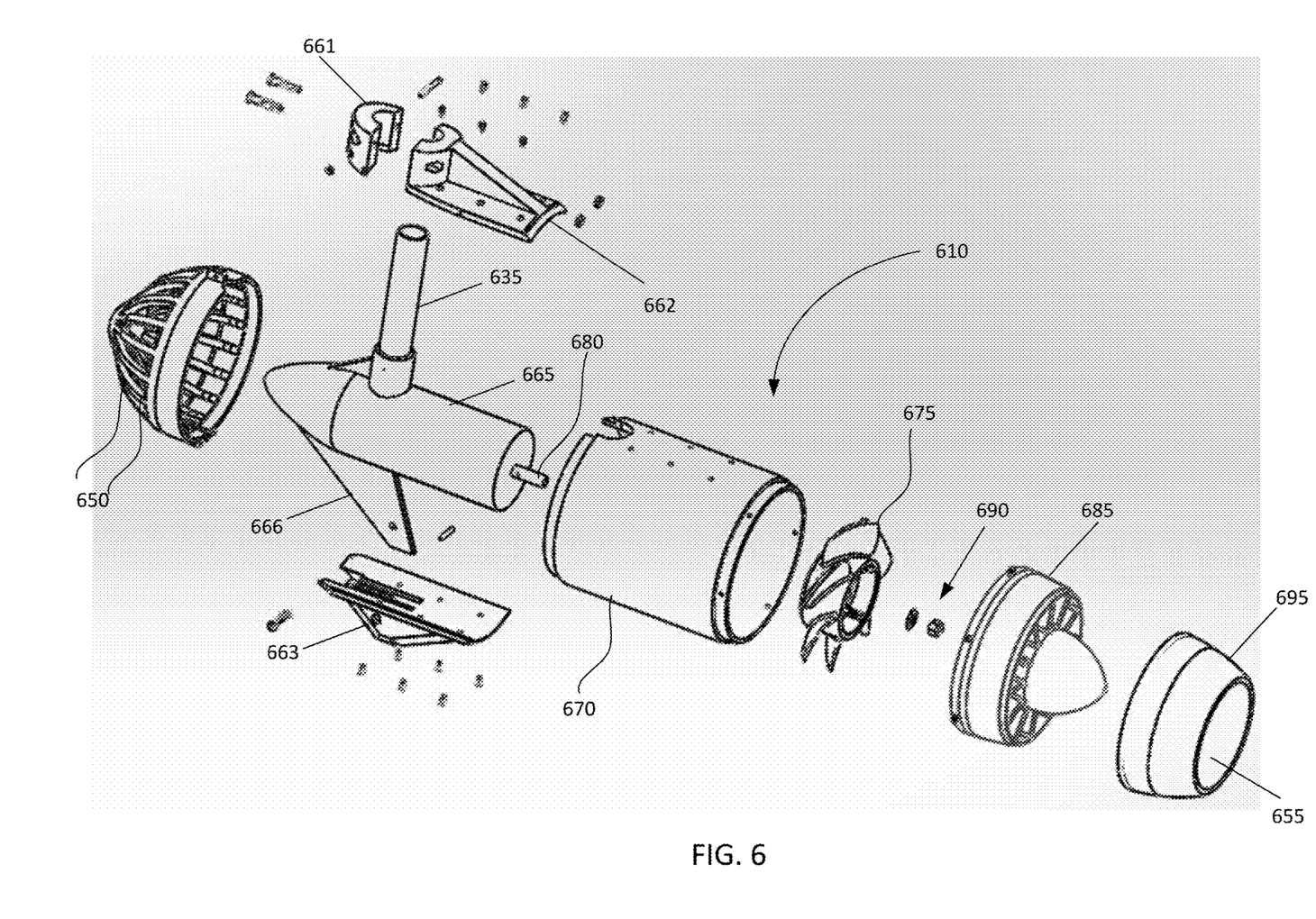
FIG. 6 shows an exploded view of a propulsion jet drive according to various example aspects of the disclosure.

FIG. 6 shows an exploded view of yet other example aspects of a jet drive 610 for use in a marine vessel propulsion system according to the disclosure. As shown in FIG. 6, the jet drive 610 includes a grate 660 on a front end thereof, the grate 660 having multiple orifices 650 for receiving sea water therethrough. Notably, the grate 660 differs from the front covers shown in FIGS. 3 and 4 (see 350, 450). Those of ordinary skill in the art will recognize that a variety of grates can be implemented in the jet drives according to the present disclosure depending on the level of debris and/or fouling in a waterway. The jet drive 610 further includes a motor 665 having a mounting rod 635 attached thereto. At least a portion of the motor 665 is positioned within a housing 670 which attaches to the grate 660. The jet drive 610 also includes an impeller 675 that is rotatable about a shaft 680 within a stator 685. The impeller 675 can be rotatably attached to the shaft 680 using any suitable affixing means 690 such as a washer and bolt. The stator 685 can be attached to the housing 670. An exit ring 695 which forms the outlet 655 can be attached to the stator 680 covering at least a portion thereof. The bracket 660 can include an outer clamp portion 661 and an inner claim portion 662 to clamp the mounting rod 635 therebetween. As shown in FIG. 6, the outer clamp portion 662 can be attached to the housing 670 by, for example, screws. The inner clamp portion 661 can be similarly attached to the grate 660. The jet drive 610 further includes a lower bracket 663, for example, a fin clamp, that attaches to the motor 665 on either side of a fin 666. The lower bracket 663 also attaches to the grate 660.

It should be noted that the jet drives can be designed in a variety of sizes. Generally, the larger the diameter of the jet drive, the more efficient the drive; however, the larger the diameter the more drag that is generated. According to certain example aspects, each jet drive can have a diameter of about 2 inches to about 10 inches. In certain aspects, each jet drive can have a diameter of about 4 inches or about 6 inches.

Control of the marine jet propulsion system of the present disclosure can be implemented in a variety of ways. Examples of such control are described U.S. Pat. No. 6,132,267, which is incorporated by reference herein in its entirety.

Figure 7:
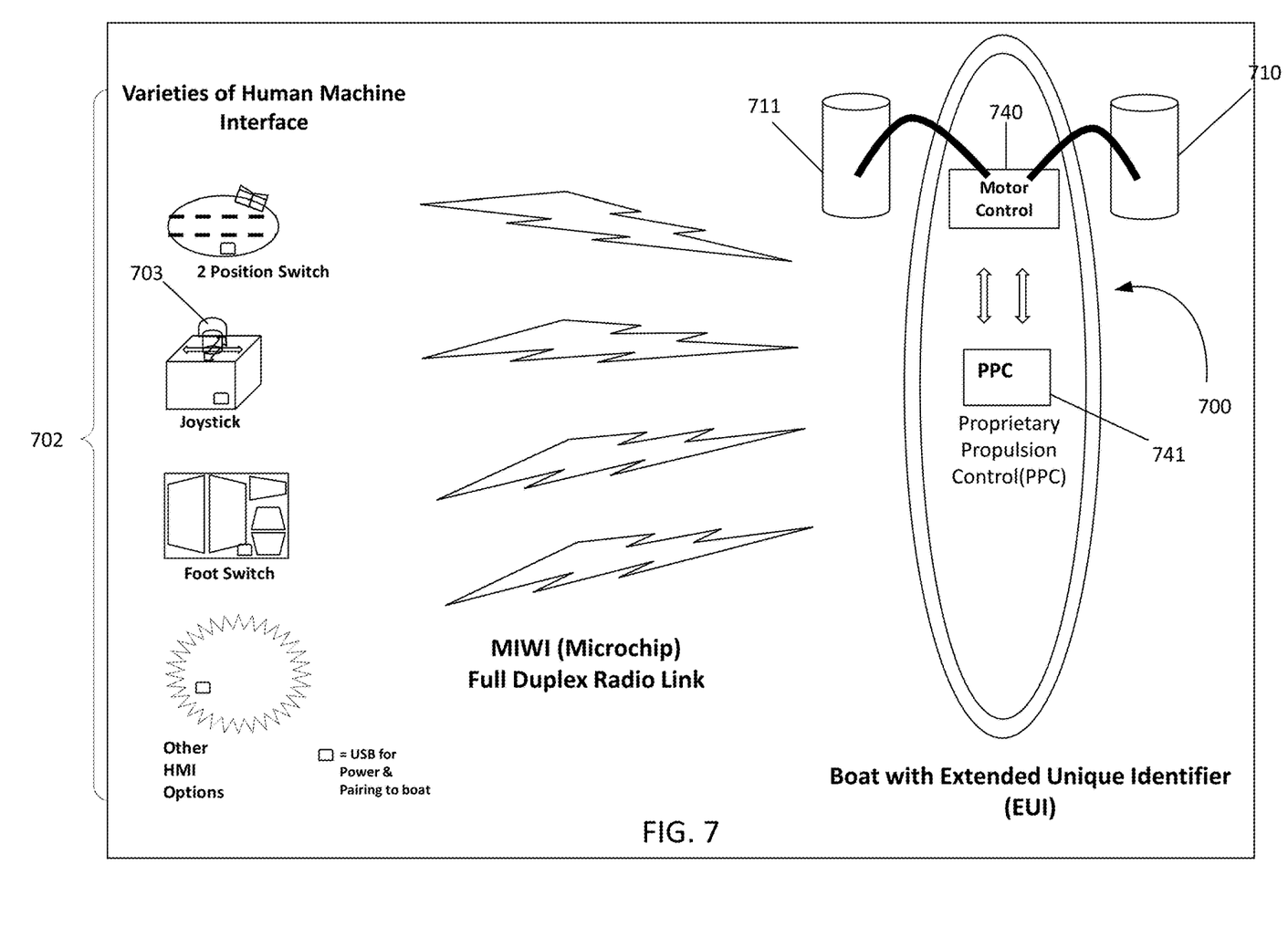
FIG. 7 shows various example aspects of human machine interfaces for the marine vessel propulsion system.

As discussed above, a marine vessel propulsion system according to various example aspects of the present disclosure can include a variety of HMIs (e.g., two-position switch, joystick, foot switch, dial, computing device such as a cell phone, etc.). As shown in FIG. 7, these HMIs 702 can be in direct communication with (i.e., directly associated with) the marine vessel propulsion system 700, particularly with the control unit 740, and/or with a processor 741 associated with the control unit 740. The HMIs 702 can also communicate with the system 700 through a computing device such as a cell phone or laptop that is in communication with the control unit 740 and/or processor 741. While a variety of HMIs 702 can be used, the HMI 702 should be capable of receiving inputs for both speed and direction from a user and transmitting such signals to the system 700. The HMI 702 should have its own independent power source and a method of pairing the HMI 702 to a particular marine vessel propulsion system 700. This can be accomplished with a universal serial bus ("USB") connection to the HMI electronics. A USB interface provides a connection which allows a computing device with a corresponding USB interface to program the extended unique identifier ("EUI") for the control unit 740 and/or processor 741 and pairs the HMI 702 with the control unit 740 and/or processor 741. In certain example aspects, multiple ones of HMI 702 can be associated with the control unit 740 and/or processor 741 to control the same system 700 provided they are all associated with the same EUI address and are programmed to operate cooperatively.

In the case of a joystick according to the present disclosure, the full translational movement of the joystick handle can indicate a desired direction and speed by the user. For example, moving the joystick forward would transmit a signal for forward direction, while moving it backward would transmit a signal for reverse direction. Moving the joystick to the upper right would transmit a signal for a right forward motion and so on. The user can also have the ability to indicate a speed with the joystick. For example, a small forward movement of the joystick would send signals to the system 700 for a low speed forward movement of the marine vessel, while a relatively large forward movement would send signals to the system 700 for a relatively higher speed forward movement of the marine vessel.

Alternatively, the joystick can be configured as a gear shift and dial such that the handle moves forward and backward to indicate desired gear speed and is also a dial that rotates clockwise and counterclockwise to indicate desired rotation. Rotation in the clockwise direction could transmit signals to the system 700 to turn right while rotation in the counterclockwise direction could transmit signals to the system 700 to turn left. Similarly, movement of the joystick in a forward direction, for example, to first gear, could transmit a signal to the system 700 to increase speed. Further movement of the joystick in the forward direction, for example, to fourth gear, could transmit a signal to the system 700 to proportionately increase the speed.

The two signals relating to speed and direction (oor a single signal indicative of both) are processed by the control unit 240, 740 and processor 741 of the marine vessel propulsion system to adjust the power to the jet drives. According to various example aspects of the disclosure, the jet drives are in a fixed position and do not rotate about the mounting rod. Therefore, a directional change of the marine vessel is accomplished by variable power control to each jet drive, independently. For example, to accomplish a right turn the jet drive on the right hand side of the vessel can operate in reverse, while the jet drive on the left hand side of the vessel operates in the forward direction. The ability to control and reverse each jet drive independently provides braking, steering and pivoting of the marine vessel.

According to certain example aspects, the control system described in column 4, line 19 to column 5, line 35 of U.S. Pat. No. 6,132,267 to Campbell, the entirety of which has been incorporated herein by reference, can be implemented for a joystick handle having forward and reverse motion only. In alternative example aspects of the disclosure, a joystick 703, 903 having full translational motion via a handle 703, 903 with the position layout 800 represented by the coordinate chart shown in FIG. 8 can be used in a control system 900 as shown in FIG. 9. As shown in FIG. 9, the control system 900 can include one or more user devices, such as a human machine interface (HMI) 902, 903, 920, a proprietary propulsion control system (PPC) 941, the motor controller 925 and the motors 910, 911. The HMI is a device used by a user to generate a signal indicative of a desired direction and speed to be transmitted to the PPC and sub modules to control movement of the marine vessel. The PPC can be a computing device, such as a processor, configured to transmit and receive data from an HMI. The computing device can process received data for further use by the motor controller 925 and motors 910, 911. The computing device can also derive or generate data and send it to one or more of the HMI devices (e.g., a wireless device, such as a Wireless Android Ruggedized Device). The motor controller 925 can be a computing device, such as a processor, that sends specific electrical signals to each of the motors 910, 911 independently. The right and left motors 910, 911 generate motion at a specific power and in a particular direction depending upon the desired inputs from the HMI (s).

Figure 8:
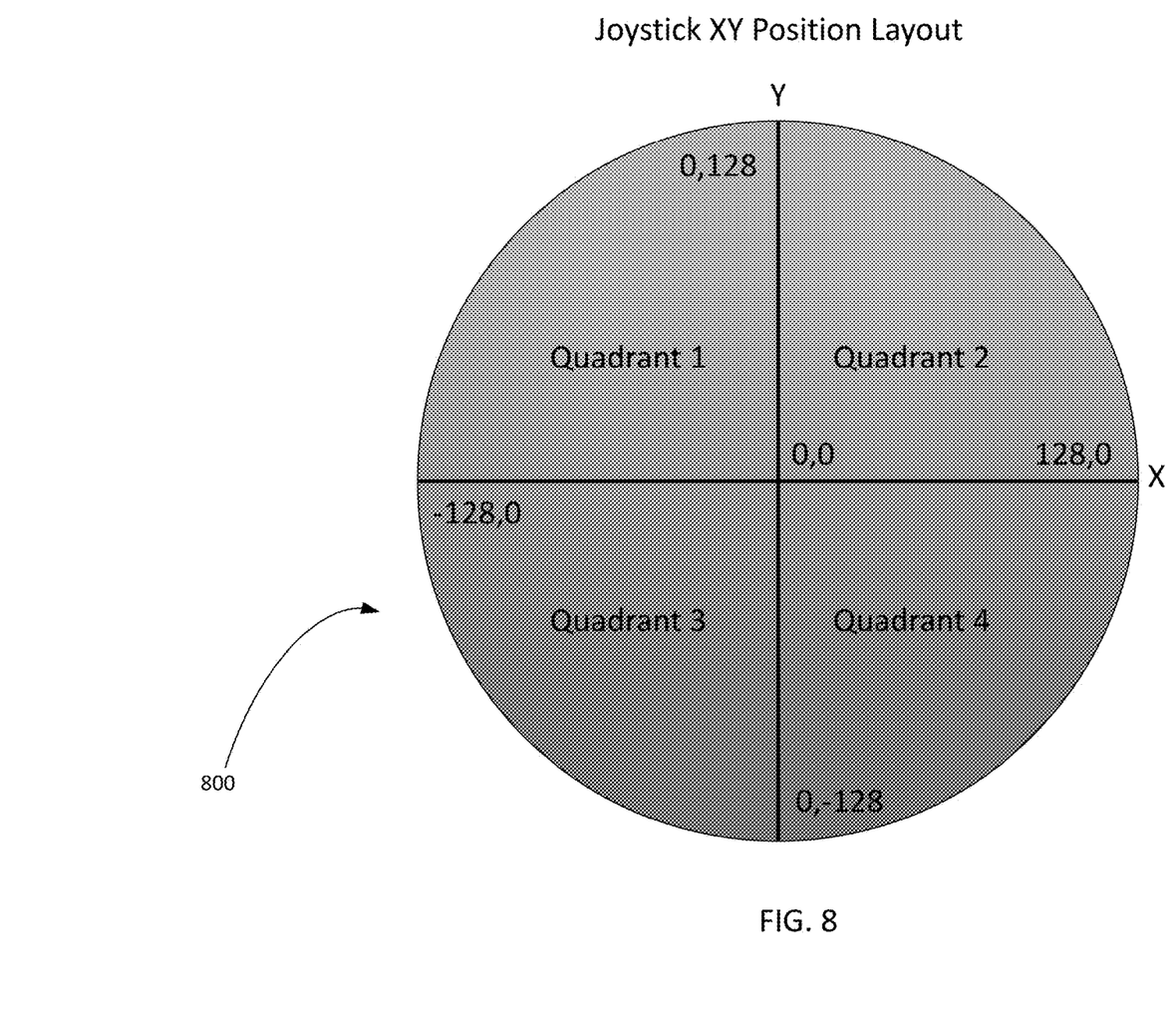
FIG. 8 shows various example aspects of a joystick coordinate chart as it relates to the position of the joystick handle according to various example
Figure 9:
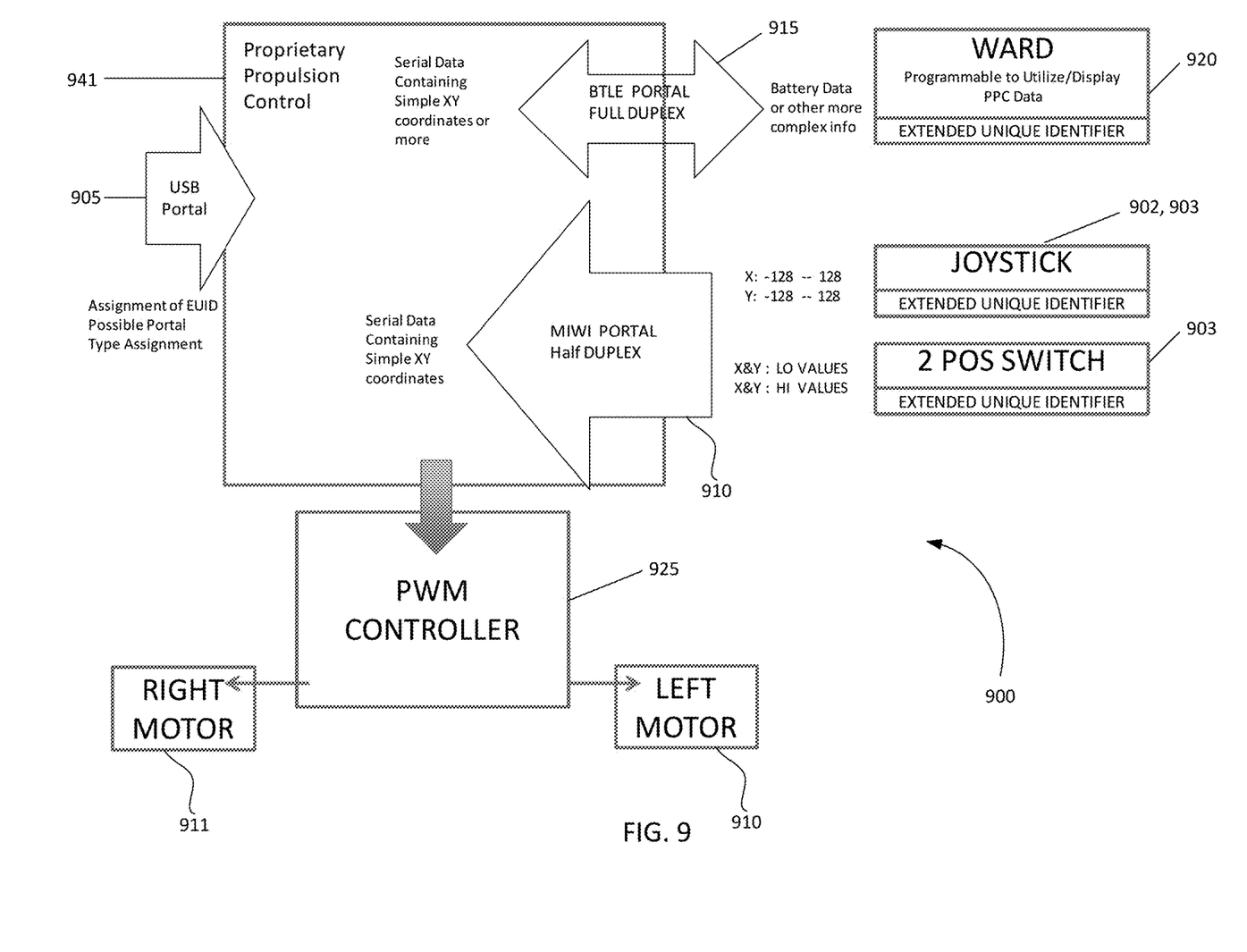
FIG. 9 shows example aspects of a control system using a variety of optional user devices according to various example aspects of the disclosure.

For example, a signal (i.e., an x and y joystick handle position coordinate represented in FIG. 8) can be generated at the joystick HMI 902 and transmitted to the PPC 941 via multiple wireless portals (MIWI, BTLE) 910, 915. The PPC can send a signal to the motor controller 925 where it is converted to independent power settings for each motor 910, 911. Each power setting ID is then delivered to the respective motor 910, 911. In the case of a wireless device (e.g., a WARD) in full duplex mode, the PPC 941 can generate data (e.g., power supply condition) and send it to the wireless device HMI (e.g., a WARD) 920 via a Bluetooth® Low Energy (BTLE) Portal 915 and the wireless device HMI 920 can display the power supply condition to the user.

Referring again to FIG. 9, the universal serial bus (USB) portal 905 allows for programming of the extended unique identifier (EUI) and can identify Device controlling data communications. In certain example aspects, the USB portal allows for programming of the Device Type. The MIWI Portal can be half duplex and can receive XY coordinate data from the joystick 902 interface, for example, XY data corresponding to the joystick position 800 as shown in FIG. 8. The Bluetooth® Low Energy (BTLE) Portal 915 can be full duplex and can receive XY coordinate data from the joystick 902 interface, for example XY data corresponding to the joystick position 800 as shown in FIG. 8. The BTLE Portal 915 can be configured to send complex data to a wireless device 920 for analysis or display. The wireless device 920 can be a wireless Android® ruggedized device (WARD) (e.g., a rugged Android® cell phone), a wireless iPhone or iPad device, or any other suitable wireless device known to those of ordinary skill in the art.

According to various example aspects, the data through the USB portal includes EUI and can include Device Type setting information. The data through the MIWI and BTLE portals can also include or incorporate EUI and XY Coordinate Data from the joystick 902, 903, 703 that is translated to motor proportioned signals including signals sent to both the left and right motor independently. The data through the BTLE portal can include power supply data and other complex data that can be derived or determined by the propriety propulsion control system (PPC) 941 and sent to the wireless device 920.

During operation, the power level for each motor 910, 911 is controlled by a processor of the PPC 941 by implementing an algorithm. More particularly, the power level for each motor is independently calculated using the following formulas. The power level for each motor is determined based on a signal received from the joystick 902, 903, 703 corresponding to an XY coordinate position 800 of the joystick 902, 903, 703 having a range of −128 through +128 for both axes as shown in FIG. 8. For the right motor 911, the x coordinate is subtracted from the y coordinate and multiplied by a predetermined constant k as follows: $R=(y-x)*k$, where $k=1.4$. For the left motor, the x coordinate is added to the y coordinate and multiplied by the constant k as follows: $L=(y+x)*k$, where $k=1.4$. Thus, both the Left and Right motors 910, 911 use the y coordinate, which provides a linear amount of thrust in the forward direction as the joystick moves in the y direction in the positive hemisphere shown in FIG. 8. The x coordinate value imparts the greatest amount of thrust difference as each motor to the other. For example, when the joystick is positioned such that x equals 60 and y equals 100, the joystick is in quadrant 2 as shown in FIG. 8. Using the above algorithm, the right motor 911 has a thrust value of 56 and he left motor 910 has a thrust value of 224. Although both motors are operating, the difference between the thrust value of the left motor 910 and right motor 911 is 168 where the left motor 910 has a thrust value that is higher than the right motor 911 by 168; accordingly, a gradual right turn motion of the watercraft will occur. Because both motors 910, 911 have positive values, the system has a general forward motion that combined with the right motion yields an arcing turn to the right. It should be noted that as the joystick position moves further to the right in the positive x-direction, the arc or curve of the turn will be tighter; as the joystick position moves downward in the y-direction toward 0,0, the arc or curve of the turn will approach a direct pivot (e.g., a straight turn cross 360°).

According to further example aspects of the disclosure, if the position of the joystick moves downward in the negative y-direction (i.e., into the negative hemisphere), another algorithm is implemented by the PPC 941, which sets the amount of thrust for each direction to be the same for each motor 910, 911 but the direction is reversed. This negatively directed thrust can slow down or stop the watercraft and/or also move the watercraft in reverse.

Figure 10:
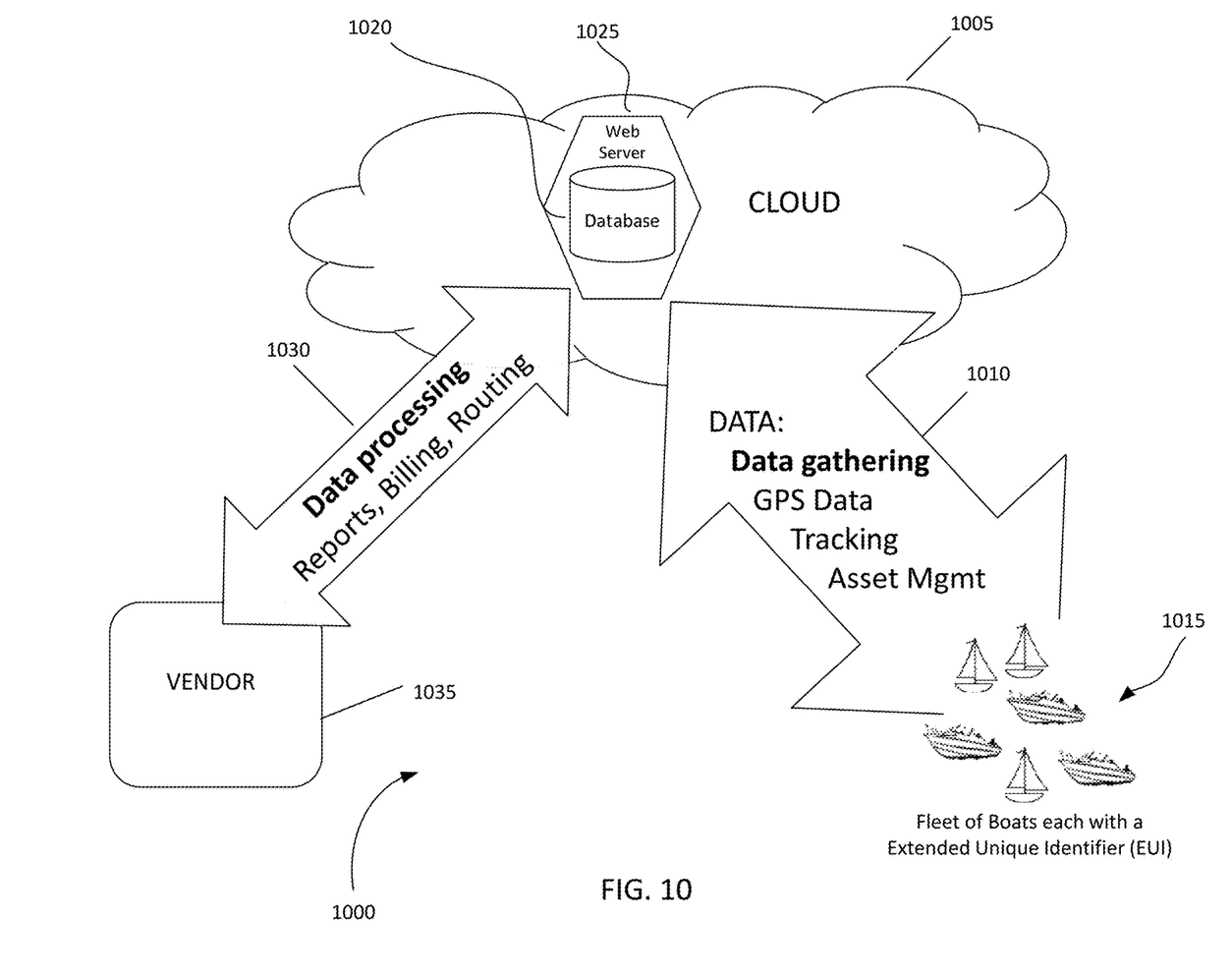
FIG. 10 shows example aspects of a web server and database according to various example aspects of the disclosure.
Figure 11:
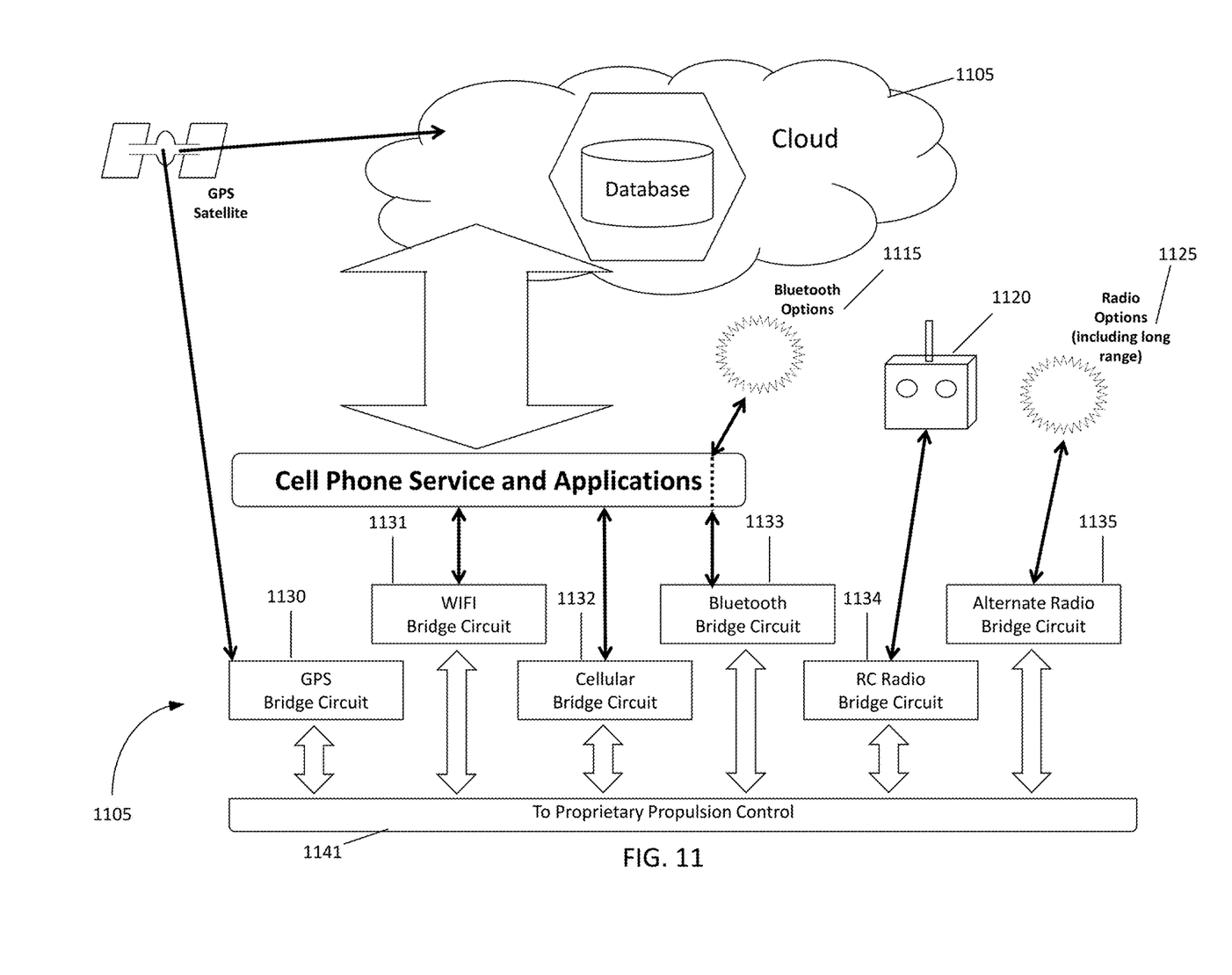
FIG. 11 shows example aspects of a communication architecture between the marine vessel propulsion system and web server and database according to various example aspects of the disclosure.
Figure 12:
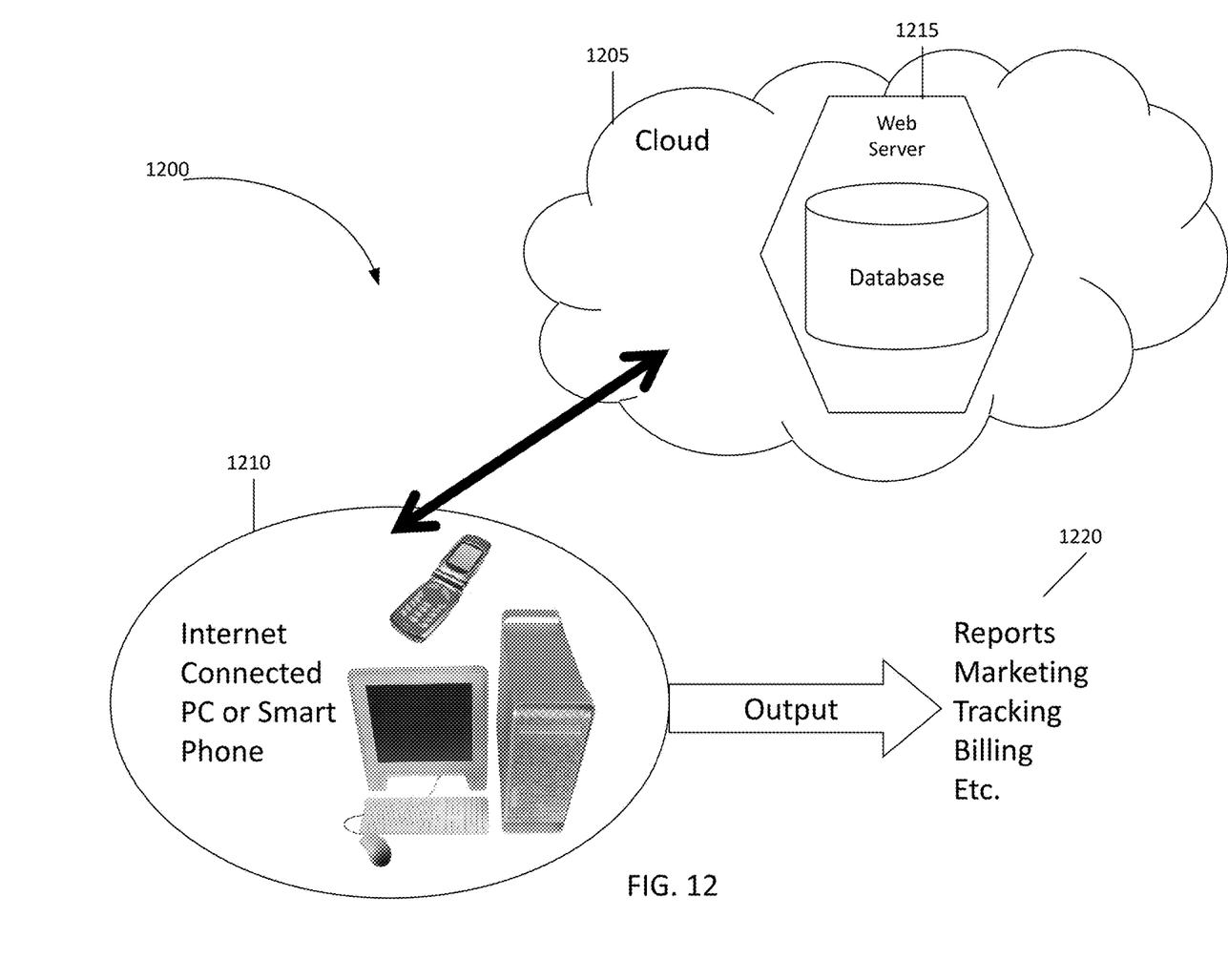
FIG. 12 shows example aspects of a communication architecture between a variety of computing devices and web server/database according to various example aspects of the disclosure.

According to other various example aspects of the disclosure, pertinent data can be located on a web server in the Cloud 1005, 1105, 1205 as shown in FIGS. 10-12. In certain example aspects of a commercial application of marine vessel systems according to the present disclosure, as shown in FIG. 10, data 1010 such as global positioning system (GPS) data, tracking data and asset management data can be transmitted from one or more marine vessels in a fleet 1015 of marine vessels each having an extended unique identifier (EUI). The data can then be stored in a data store, such as a database 1020 associated with a web server 1025 in the Cloud 1005 and/or processed for reports, billing, routing and other purposes. The data and/or processed information can then be transmitted to a vendor 1035 for further use. According to certain example aspects, the data store may be a memory (e.g., random access memory), a cache, a drive (e.g., a hard drive), a flash drive, a database system, or another type of component or device capable of storing data. The data store may also include multiple storage components (e.g., multiple drives or multiple databases) that may also span multiple computing devices (e.g., multiple server computers). In some aspects, the data store 1120 may be cloud-based. One or more of the devices of system may utilize their own storage and/or the data store to store public and/or private data. In some aspects, the data store can be utilized for data back-up or archival purposes.

FIG. 11 shows an example system 1100 according to various example aspects of the disclosure that utilizes the Cloud 1105 various devices such as a cell phone service and applications, Bluetooth® devices, radio devices, etc. 1110, 1115, 1120, 1125 that communicate with a Proprietary Propulsion Control (PPC) unit 1141 via a variety of bridge circuits 1130 to 1135. The system 1100 can also utilize GPS communications to transmit and receive data from the various components.

FIG. 12 is yet another example system 1200 according to aspects of the disclosure. For example, a vendor can utilize a computing device 1210 that receives and transmits data from the web server 1215 located in the Cloud 1205. The vendor computing system 1210 can also generate reports, marketing materials, tracking information, billing information, etc. useful to its business (e.g., the rental of marine vessels equipped with marine vessel propulsion systems according to the disclosure).

According to certain example aspects, the disclosure further relates to a network having a Cloud web server, a data store accessible to the Cloud web server, a management computing device communicatively coupled to the Cloud web server, a propulsion control system attached to a vessel and communicatively coupled to the Cloud web server, and a user device communicatively coupled to the propulsion control system. The data store can contain global positioning data, tracking data, and/or asset management data for the vessel. A portion of the data store can be updateable by an update signal (e.g., a first signal) from the propulsion control system to the Cloud web server. The propulsion control system can be controllable by a control signal (e.g., a second signal) from the user device.

What is claimed is:

1. A marine vessel propulsion system, comprising:
a plurality of motors comprising a left motor and right motor;
a memory;
a processing device operatively coupled to the memory, wherein the processing device is to:
receive, from a user device, a signal indicative of a desired direction and speed input to the user device;
store the desired direction and speed signal in the memory;
generate a plurality of control signals indicative of a power input, wherein each of the plurality of control signals is associated with a particular one of the plurality of motors of the marine vessel propulsion system; and
transmit each of the control signals to a corresponding one of the motors to move the marine vessel in a desired direction and at a desired speed, wherein:

the user device comprises a joystick, the desired direction and speed are based on a position of the joystick, the position of the joystick is indicated by a position of a handle of the joystick as it relates to a coordinate chart, and each of the plurality of control signals is generated based on an x,y coordinate of the handle, wherein the plurality of control signals comprises a power level for the right motor (R) being based on the formula R=(y−x)*k and a power level for the left motor (L) being based on the formula L=(y+x)*k, where k=1.4.

2. The system of claim 1, wherein each of the control signals inputs a speed and direction to the corresponding one of the motors.

3. The system of claim 2, wherein each of the plurality of motors is a marine jet and the direction of the motor is forward or reverse.

4. The system of claim 1, wherein the x,y coordinate of the handle is indicative of an overall desired direction of the marine vessel propulsion system.

5. A method of controlling speed and direction of a marine vessel, comprising:

receiving, from a user device, a signal indicative of a desired direction and speed input to the user device;

storing the desired direction and speed signal in the memory;

generating a plurality of control signals indicative of a power input, wherein each of the plurality of control signals is associated with a particular one of a plurality of motors of the marine vessel, wherein the plurality of motors comprises a left motor and right motor; and transmitting each of the control signals to a corresponding one of the motors to move the marine vessel in a desired direction and at a desired speed, wherein:

the user device comprises a joystick, the desired direction and speed are based on a position of the joystick, the position of the joystick is indicated by a position of a handle of the joystick as it relates to a coordinate chart, and each of the plurality of control signals is generated based on an x,y coordinate of the handle, wherein the plurality of control signals comprises a power level for the right motor (R) being based on the formula R=(y−x)*k and a power level for the left motor (L) being based on the formula L=(y+x)*k, where k=1.4.

6. The method of claim 5, wherein each of the control signals inputs a speed and direction to the corresponding one of the motors.

7. The method of claim 6, wherein each of the plurality of motors is a marine jet and the direction of the motor is forward or reverse.

8. The method of claim 5, wherein the x,y coordinate of the handle is indicative of an overall desired direction of the marine vessel propulsion system.

* * * * *